United States Patent

Santen et al.

[11] Patent Number: 6,155,965
[45] Date of Patent: Dec. 5, 2000

[54] TREATMENT OF FLY ASH

[75] Inventors: Sven Santen; Borje Johansson, both of Hofors, Sweden

[73] Assignee: Kaverner Oil & Gas AS, Lysaker, Norway

[21] Appl. No.: 08/934,333

[22] Filed: Sep. 19, 1997

Related U.S. Application Data

[63] Continuation of application No. PCT/NO96/00032, Feb. 13, 1996.

[30] Foreign Application Priority Data

Apr. 7, 1995 [NO] Norway ..................................... 951382

[51] Int. Cl.⁷ ..................................................... A62D 3/00
[52] U.S. Cl. ............................................ 588/256; 588/231
[58] Field of Search ................................... 588/256, 252, 588/249, 231

[56] References Cited

U.S. PATENT DOCUMENTS

| | | | |
|---|---|---|---|
| 4,188,892 | 2/1980 | Kiefer et al. | 110/238 |
| 4,410,358 | 10/1983 | Heshmatpour . | |
| 4,455,165 | 6/1984 | Santen . | |
| 4,487,628 | 12/1984 | Bjorling . | |
| 4,508,566 | 4/1985 | Eriksson . | |
| 4,801,435 | 1/1989 | Tylko . | |
| 4,957,527 | 9/1990 | Hnat | 65/19 |
| 5,228,901 | 7/1993 | Taylor . | |
| 5,245,120 | 9/1993 | Srinivasachar et al. | 588/256 |
| 5,273,566 | 12/1993 | Balcar et al. | 65/17 |

FOREIGN PATENT DOCUMENTS

| | | |
|---|---|---|
| 1529526 | 10/1978 | United Kingdom . |
| 1538460 | 1/1979 | United Kingdom . |

*Primary Examiner*—William Neuder
*Assistant Examiner*—Zakiya Walker
*Attorney, Agent, or Firm*—W. Warren Taltavull; Farkas & Manelli PLLC

[57] ABSTRACT

A method and apparatus for treatment of the fly ash are described wherein heavy metals are separated and wherein there is formed a leaching resistant slag; the fly ash is introduced into a reactor into an oxidizing gas stream which is heated to at least 2500 degrees C. in a plasma generator; the fly ash melts and forms liquid drops of slag and a carbonaceous or hydrocarbonaceous material is added to the gas stream which burns and supplies extra energy to the process; the ratio of oxygen and carbon is regulated so that the ratio $CO_2/CO+CO_2$ is kept within the limits 0.4–0.9; heavy metals in the fly ash such as zinc and lead are reduced and passed into the gas phase with the gas discharged from the reactor, cooled and washed and the metal oxides are separated; the slag is collected in the bottom of the reactor and can be continuously tapped via a slag lock; the slag's content of calcium oxide and silicon dioxide can be regulated by the admixture of a slag-forming material with a high content of silicon dioxide.

5 Claims, 2 Drawing Sheets

TREATMENT OF FLY ASH

This is a Continuation of: International Appln. No. PCT/NO96/00032 filed Feb 13, 1996 which designated the U.S.

The invention concerns a method and a plant for smelting of fly ash into a leaching resistant solid material and for simultaneous recovery of a zinc and lead-rich secondary dust.

The problems of fly ash from waste incineration have been receiving a growing amount of attention due to the leaching of heavy metals and poisonous organic substances in connection with disposal. Attempts to solve the problem by binding the fly ash, e.g. in cement, have not provided acceptable results. There are known methods available for this purpose. Experiments are now in progress involving smelting fly ash in furnaces for the production of glass and in arc furnaces. These processes, however, have proved to be difficult to control in order to obtain a homogeneous slag. The processes also offer limited possibilities for removing heavy metals such as zinc and lead.

The object of the present invention is to obtain a method and a plant for treatment of fly ash wherein heavy metals are separated and wherein a leaching resistant slag is formed. These objects are achieved according to the invention with a method and a plant which are characterized by the features presented in the patent claims.

In the present invention fly ash is brought to smelting point by introducing it into a very hot gas stream with a temperature above 2500° C. The fly ash is introduced into a constriction in a reactor and at an angle of 120 to 80 degrees to the gas flow. The gas stream with the content of fly ash expands in the reactor which is conical in shape with increasing volume. During transport through the reactor heat energy is supplied to the fly ash, thus causing it to melt and form liquid slag drops.

The gas can consist of air or another oxidizing gas. Together with the fly ash a fuel such as, e.g., a carbon or a hydrocarbonaceous material is introduced, thus causing an incomplete combustion. This incomplete combustion supplies energy to the process, thus reducing the energy requirement from the gas stream. The gas is advantageously heated by means of electrical energy in a plasma generator.

The ratio between oxidizing gas, fuel supplied and carbon or hydrocarbons which may be present in the fly ash is regulated in such a manner that the ratio $CO_2/CO+CO_2$ is kept within the limits 0.4–0.9. Most of the zinc and lead oxides in the fly ash are thereby reduced to metal which on account of its high vapour pressure will exist in the gas phase. In addition to the supply of energy, the admixture of carbon or a hydrocarbonaceous material also has the ability to repress the formation of NOx and thus the admixture is also an extremely important aid to reducing NOx emission from the waste gas.

After smelting of the fly ash and evaporation of zinc and lead, the liquid slag drops are separated from the gas by altering the gas direction so that the gas flow is deflected towards a surface of liquid slag in the bottom of the reactor. The drops of slag are collected in the liquid slag. The gas is discharged from the reactor and is cooled and cleaned, and a zinc and lead-rich dust can be recovered.

In order to obtain a slag with a high degree of leaching resistance the slag's content of CaO and $SiO_2$ can be regulated in such a manner that the ratio $CaO/SiO_2$ is kept at less than 1.2. This regulation can be carried out by adding a slag-forming material with a high $SiO_2$ content together with the fly ash.

The slag can be continuously discharged from the reactor through a slag lock and can be cast into blocks or alternatively granulated by casting in water.

Apart from zinc and lead the bulk of the chlorine and sulphur as well as some alkali will evaporate and be separated from the fly ash. These substances are advantageously separated from the gas in a gas scrubber.

The invention will now be described in more detail in connection with drawings and tables. The drawings illustrate in purely schematic form embodiments of a reactor and a plant, only the principles of the invention being illustrated.

Table 1 shows the analysis results of the metal elements in mg/l after a leaching test of slag of fly ash formed in a plant according to the invention. The analysis results are compared with a leaching test of the original fly ash.

Table 2 shows the chemical components and the elements in weight percentage for one type of fly ash.

Table 3 shows the main content of the chemical elements in slag, sludge, return water and waste gas which are formed in a plant.

Table 4 shows the chemical compounds and the elements in weight percentage in a leaching resistant slag.

Table 5 shows the chemical compounds and the elements in weight percentage in sludge.

Table 6 shows the chemical compounds and the elements in weight percentage in waste gas after gas cleaning.

Figure 1:
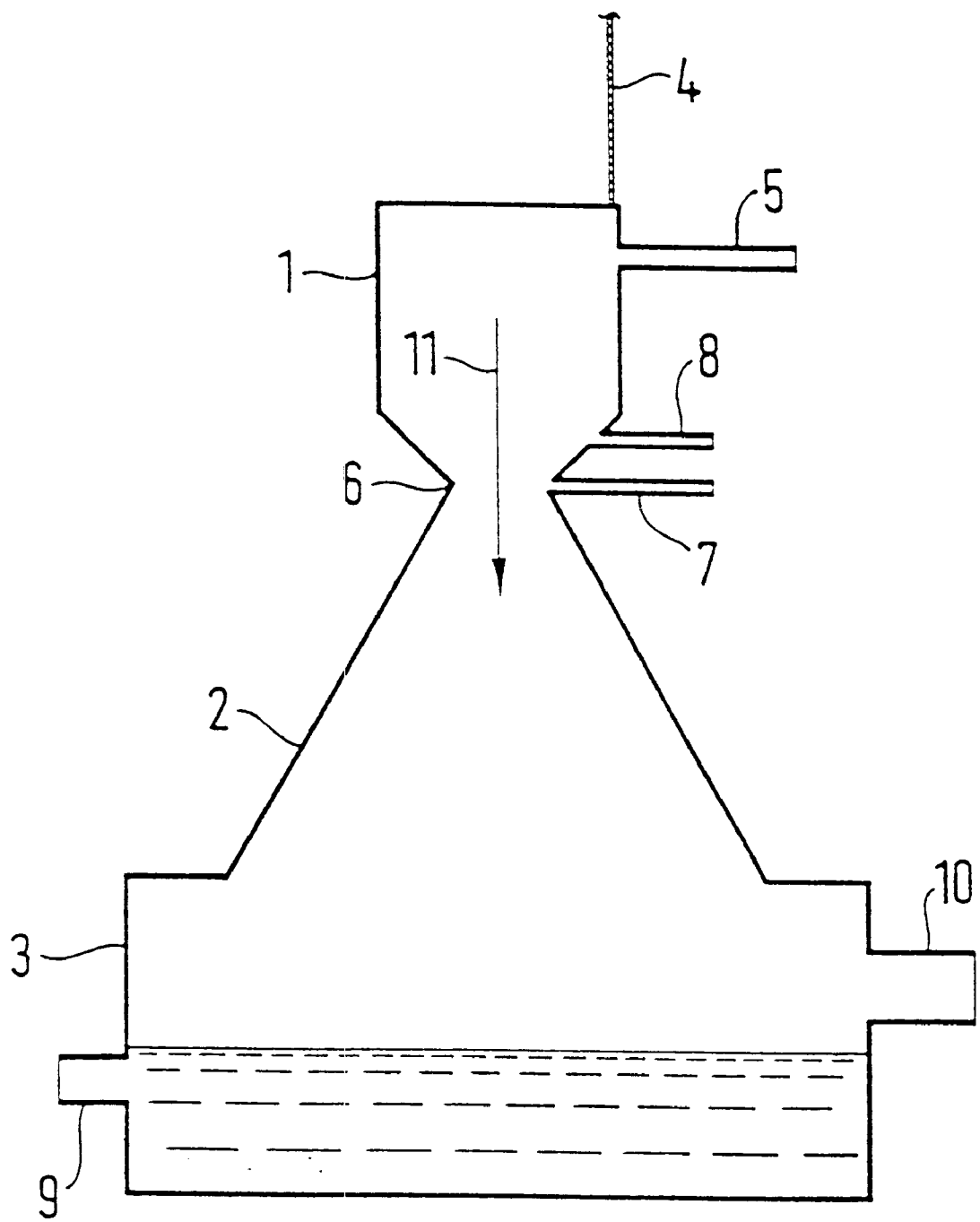
FIG. 1 is a longitudinal section of a reactor.

FIG. 1 illustrates the main part of the plant which is composed of a plasma generator 1 in connection with a reactor 2. The plasma generator 1 is supplied with electrical energy through a cable 4 and with air through a pipeline 5. The air is heated and ionized in the plasma generator 1 and flows down into the reactor 2 as illustrated by the arrow 11. The inlet to the reactor is equipped with a constriction 6. In this constriction 6 there is installed a supply pipe 7 for fly ash. The fly ash is introduced at an angle of 80 to 120 degrees to the air flow 11. In the constriction 6 there is also installed a supply pipe 8 for a fuel. The fuel may be a carbon or a hydrocarbon material.

The reactor 2 is conical in shape with increasing volume as the distance increases from the plasma generator. In connection with the reactor 2 an additional reactor 3 is installed which can be designed as a slag cyclone for collection of drops of liquid fly ash as slag in the bottom of the reactor 3. The reactor 3 has outlet devices for slag in the form of a slag lock 9 and an outlet pipe 10 for gas.

Figure 2:
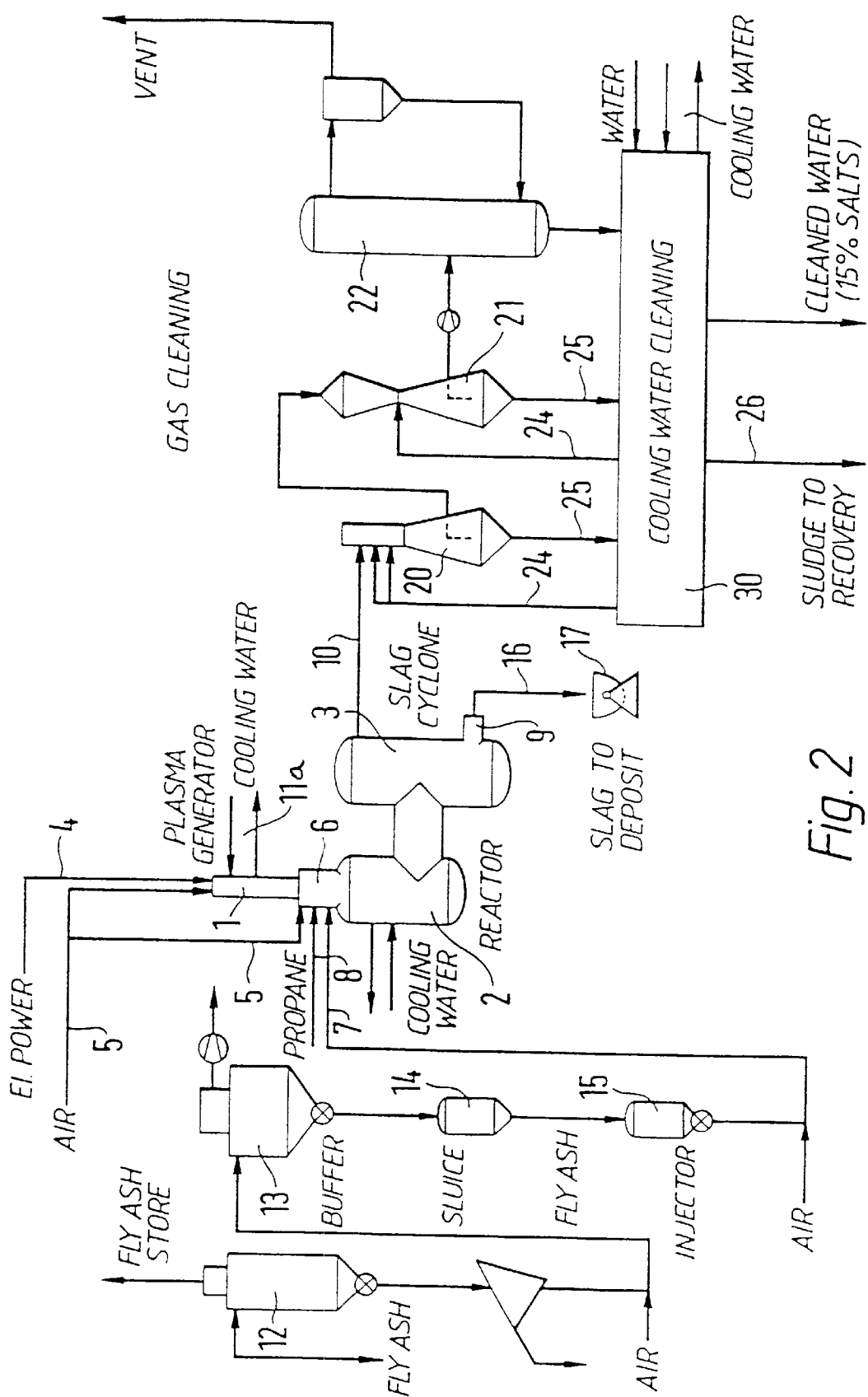
FIG. 2 illustrates a simplified plant.

The plant which is described in FIG. 2 illustrates the main features which are of importance for the present invention, all the other pipelines and wiring which would normally be present and used in such a plant being omitted for reasons of clarity. Thus the drawing only illustrates the principles which are employed in the invention.

The main part of the plant consists of a plasma generator 1 in connection with a reactor 2 and a slag cyclone 3. The plasma generator has a supply cable 4 for electrical energy and a supply pipeline 5 for air. The inlet to the reactor 2 is equipped with a constriction 6. In this constriction 6 there is installed a supply pipeline 5 for air, a supply pipeline 7 for fly ash and a supply pipeline 8 for fuel. Both the plasma generator 1 and the reactor 2 can have elements or parts which are water-cooled and cooling water pipelines are indicated by reference numeral 11*a*.

The plant is equipped with silos 12 and a buffer silo 13 for storage of fly ash and with a container 14 and injector device 15 for the supply of fly ash to the reactor 2 through the pipeline 7.

The slag cyclone 3 has an outlet device for slag in the form of a slag lock 9. Slag can be drawn off into a crucible 17 through the pipeline 16.

The slag cyclone 3 has an outlet pipeline 10 for gas. The gas is passed to gas cleaning equipment which consists of a gas cooler 20, gas scrubber 21, which a can be a venturi scrubber, and a gas conditioner 22 which may also be a washing tower. The gas cooler 20 may be in the form of a heat exchanger. The gas cooler 20 and the gas scrubber 21 have supply pipelines 24 for cooling water and outlet pipelines 25 for return water.

Heavy metals such as zinc, lead and cadmium are washed out in the gas scrubber 21 and can be recovered as sludge which is discharged through pipeline 26 to a finishing process. Chlorine and sulphur are also washed out in gas scrubber 21 as water-soluble salts through pipeline 25. In gas conditioner 22 the gas is cleaned for possible undesirable residues.

In the water purification plant 30 dust and particles from the gas cleaning will be precipitated as sludge and discharged through pipeline 26. Salts which form chlorides and sulphates are normally water-soluble and will be dissolved in the water.

In an embodiment of a plant according to the invention 630 kg of slag were formed per 1000 kg of fly ash. The electrical energy consumption in the plasma generator was 920 kWh per 1000 kg of fly ash. The air supply was 200 Nm3/hour. Propane was supplied as a fuel at 9 Nm3/hour. The waste gas was cleaned in a venturi scrubber and 75 kg of secondary dust were separated from the cleaning water. The secondary dust contained approximately 60% zinc and lead, mainly as oxides.

In table 1 the results are shown after an EPA standard leaching test of the slag which was formed by the method according to the invention. The values are lower than the permitted limits for materials which can be used as filling material for, e.g., road building.

The leaching test was performed according to "Maximum leachable material" which is the most demanding of the available test methods which can be performed on a slag material. The maximum content of metals is determined in extracts where four samples of finely-ground slag have been leached.

The test consists in adding sulphuric water with a pH value of 4.5 to 125 g of finely-ground slag. The leaching takes place during a 24 hour period while the mixture is stirred. After 24 hours a new portion of slag is added while the pH value is simultaneously adjusted to 4.5 by the addition of sulphuric acid. This procedure is repeated four times before the leaching water is analyzed.

In the first column in table 1 the analysis results of the metal elements are shown in mg/l after a leaching test of slag formed in a plant according to the invention. In the second column the analysis results of the metal elements are shown in mg/l in the original fly ash. The third column shows 6 times the highest values which are accepted as the drinking water standard for any of the metal elements according to EPA.

The chemical compounds and the elements in fly ash are illustrated in table 2. The table shows the analysis results in weight percentage for one type of fly ash.

From the process according to the invention there is also formed a leaching resistant slag, a metal-rich sludge and a waste gas. In addition the return water will contain chlorides and sulphates from water-soluble salts. The main content of the chemical elements in slag, sludge, return water and gas are shown in table 3.

The chemical compounds and the elements in a leaching resistant slag are shown in table 4. The table shows the analysis results in weight percentage.

The chemical compounds and the elements in sludge precipitated from return water after gas cleaning are shown in table 5. The table shows the analysis results in weight percentage.

Table 6 shows the chemical compounds and the elements in waste gas after gas cleaning and gas conditioning. The table shows the analysis results in volume percentage.

TABLE 1

| Ni | mg/l | 0,55  | 12   | 2,1  |
|----|------|-------|------|------|
| Pb | mg/l | <0,05 | 9,2  | 0,3  |
| V  | mg/l | 0,05  | 0,3  |      |
| Cd | mg/l | 0,02  | 0,2  | 0,06 |
| Cr | mg/l | 0,02  | 4,5  | 0,3  |
| Fe | mg/l | 8     | 41   |      |
| Ca | mg/l | 90    | 2000 |      |
| K  | mg/l | 31    | 6700 |      |
| Co | mg/l | 0,04  | 0,02 |      |
| Cu | mg/l | <0,01 | 1,1  |      |
| Mn | mg/l | 0,94  | 0,02 |      |
| Mo | mg/l | 0,24  | 1,4  |      |
| Na | mg/l | 0     | 4700 |      |
| Zn | mg/l | 4     | 22   |      |
| Al | mg/l | 0,55  | na   |      |

The analysis results of the metal elements in slag treated according to the invention are shown in column 1. In column 2 the results are shown on a leaching test of the original fly ash. Column 3 shows six times the highest values which are accepted as EPA drinking water standard.

TABLE 2

Chemical compounds and elements in one type of fly ash

|         | Weight percentage |
|---------|-------------------|
| S       | 3,5               |
| Cl      | 10,0              |
| $P_2O_5$| 1,0               |
| CaO     | 18                |
| MgO     | 3                 |
| $K_2O$  | 7                 |
| $NaO_2$ | 6,5               |
| $SiO_2$ | 20                |
| $Al_2O_3$| 10               |
| $Fe_2O_3$| 3                |
| Pb      | 1                 |
| Zn      | 3                 |
| Cd      | 0,05              |
| Cr      | 0,03              |
| Cu      | 0,1               |
| Mn      | 0,1               |
| Ni      | 0,01              |
| Sn      |                   |
| Ti      | 0,6               |

TABLE 3

Chemical main elements in slag, sludge, return water and gas

| Leaching resistant slag | Slag from return water | Return water | Gas |
|---|---|---|---|
| Phosphorus | Lead | Sulphur | Carbon |
| Calcium | Zinc | Chlorine | |
| Magnesium | Cadmium | Potassium | |
| Silicon | Mercury | Sodium | |
| Iron | (small amounts) | | |
| Chromium | of other metals) | | |
| Copper | | | |
| Manganese | | | |
| Nickel | | | |
| Titanium | | | |

TABLE 4

Chemical compounds and elements in weight percentage in one type of slag

| | Weight percentage |
|---|---|
| $SiO_2$ | 32 |
| CO | 33 |
| $Al_2O_3$ | 19 |
| MgO | 4 |
| FeO | 3 |
| Zn | 3 ---> 0,3 |
| Pb | 0,2 ---> 0,02 |
| $P_2O_5$ | 1,6 |
| MnO | 0,2 |
| CuO | 0,1 |
| $TiO_2$ | 2,5 |

TABLE 5

Chemical compounds and elements in weight percentage in one type of sludge

| | Weight percentage |
|---|---|
| $SiO_2$ | 3 |
| $M_3O$ | 5 |
| $Al_2O_3$ | 2 |
| CaO | 4 |
| $K_2O$ | 3 |
| $N_2O$ | 3 |
| PbO | 21 |
| ZnO | 37 |
| S | 1 |
| LOI (loss of ignition) | 37 |

TABLE 6

Chemical compounds and elements in volume percentage in waste gas after gas cleaning

| | Weight percentage |
|---|---|
| CO | 10 |
| $CO_2$ | 14 |
| $H_2$ | 5 |
| $N_2$ | 69 |
| $CH_4$ | 0 |
| $O_2$ | 1 |

What is claimed is:

1. A method for smelting fly ash to a leaching resistant slag while simultaneously being able to separate the content of heavy metals such as zinc and lead, characterized in that the fly ash is introduced into an oxidizing gas which has a temperature which is 2500° C. or higher, and that there is added a carbon or hydrocarbonaceous substance which supplies additional energy to the process, thus bringing the fly ash to smelting point as drops of slag, that heavy metals such as zinc and lead are reduced, pass into the gas phase and are recovered in one or more subsequent stages as zinc and lead compounds in a dust from and that drops of slag are collected as liquid leaching resistant slag.

2. A method for smelting fly ash according to claim 1, characterized in that the oxidizing gas is passed through a plasma generator for heating.

3. A method for smelting fly ash according to claims 1, characterized in that the degree of oxidation of the gas is regulated in such a manner that the ratio $CO_2/CO+CO_2$ is kept within the values 0.4–0.9 by regulating the supply of a carbon or hydrocarbonaceous material.

4. A method for smelting fly ash according to claim 3, characterized in that the degree of leaching of the slag formed is regulated by keeping the ratio $CaO/SiO_2$ lower than 1.2, preferably with the admixture of a slag-forming material to the fly ash with a high content of $SiO_2$.

5. A system for smelting fly ash to a leaching resistant slag while simultaneously being able to separates the content of heavy metals such as zinc and lead, characterized in that a plasma generator (1) with a supply device (4) for electrical energy and a supply device (5) for oxidizing gas is installed in connection with a first reactor (2), the first reactor (2) is conical in shape with increasing volume in the direction away from the plasma generator (1), the inlet to the first reactor (2) is equipped with a constriction (6), a supply device (7) for fly ash and optionally a slag-forming material, and a supply device (8) for a fuel, perpendicular to the first reactor (2) there is installed a second reactor (3) for collection of the smelted fly ash, the second reactor (3) has an outlet device (10) for gas and an outlet device (9) in the form of a slag lock for slag.

* * * * *